United States Patent
Morikawa et al.

[11] Patent Number: 5,943,405
[45] Date of Patent: Aug. 24, 1999

[54] CREDIT CALLING SERVICE SYSTEM

[75] Inventors: Toshihiro Morikawa; Kouki Shigaki; Ryoji Yokoyama, all of Fukuoka, Japan

[73] Assignee: Fujitsu Limited, Kanagawa, Japan

[21] Appl. No.: 08/734,045

[22] Filed: Oct. 18, 1996

[30] Foreign Application Priority Data

Feb. 19, 1996 [JP] Japan .................................... 8-030969

[51] Int. Cl.⁶ .................................................. H04M 15/00
[52] U.S. Cl. ......................... 379/118; 379/112; 379/115; 379/120; 379/243
[58] Field of Search .................................... 379/111, 112, 379/114, 115, 118, 121, 130, 229, 230, 144, 127, 208, 243, 251, 245, 120

[56] References Cited

U.S. PATENT DOCUMENTS

| | | | |
|---|---|---|---|
| 5,206,899 | 4/1993 | Gupta et al. | 379/243 |
| 5,481,603 | 1/1996 | Gutierrez et al. | 379/229 |
| 5,511,113 | 4/1996 | Tasaki et al. | 379/114 |

FOREIGN PATENT DOCUMENTS

556196  3/1993  Japan .

*Primary Examiner*—Paul Loomis
*Assistant Examiner*—Binh K. Tieu
*Attorney, Agent, or Firm*—Helfgott & Karas, P.C.

[57] ABSTRACT

A system is provided for enabling a subscriber using a credit call service to utilize a telecommunication service subscribed by the subscriber himself or herself. The credit call service system is provided with a service switcher station for registering telecommunication service information for identifying the telecommunication service that each terminal subscribes, a service controller for registering the telecommunication service information of the telecommunication service that the subscriber who subscribes the credit call service subscribes by himself or herself, and a service information replacement unit for replacing the telecommunication service information registered in the service switcher station by the telecommunication service information registered in the service controller upon the receipt the credit call service request from the subscriber. As a result, the subscriber may receive the telecommunication service that the subscriber subscribed, irrespective of the telecommunication service that the used terminal subscribes.

4 Claims, 7 Drawing Sheets

| ID NUMBER | SERVICE CLASS INFORMATION | |
|---|---|---|
| 0 | A01 | (THREE-TERMINAL TELECOMMUNICATION SERVICE) |
| 1 | A02 | (ABBREVIATED DIALING SERVICE) |
| 2 | A03 | (CAMP-ON SERVICE) |
| 3 | A04 | |
| 4 | A05 | |
| 5 | A06 | . |
| 6 | A07 | . |
| 7 | A08 | . |
| 8 | A09 | . |
| 9 | A10 | . |
| 10 | A11 | . |
| 11 | A12 | . |
| 12 | A13 | . |
| 13 | A14 | . |
| 14 | A15 | . |
| 15 | A16 | . |
| 16 | A17 | . |
| 17 | A18 | . |
| 18 | A19 | . |
| 19 | A20 | . |
| 20 | A21 | . |
| 21 | A22 | . |
| 22 | A23 | . |
| 23 | A24 | . |
| 24 | A25 | . |
| 25 | A26 | . |
| 26 | A27 | . |
| 27 | A28 | . |
| 28 | A29 | . |
| 29 | A30 | . |
| 30 | A31 | . |

CREDIT CALLING SERVICE SYSTEM

BACKGROUND OF THE INVENTION

1. Field of the Invention

The present invention relates to a credit calling service system for charging a telephone call charge to subscribers themselves.

2. Description of the Related Art

Recently, a telecommunication network which is called an intelligent network is realized in response to various demands from the subscribers. The intelligent network is provided with a data base, a processor and the like for controlling switchers. The intelligent network controls the switchers within the network by using the data base, the processor and the like to thereby realize a flexible routing control or a fine service corresponding to the users' request.

For the intelligent network, it is required to realize a service system which is called a credit calling service. The credit calling service is such that the charge for the telephone call charge not to the terminal at the calling resource but to the subscriber at the calling resource. Namely, even if the subscriber at the calling resource makes a telephone call from any terminal, the telephone calling charge is charged to the subscriber himself or herself at the calling resource.

According to such a credit service, the subscriber at the calling resource may make a telephone call from any outside telephone or a public telephone on a cashless basis.

Also, in the intelligent network, various services such as a calling free telecommunication (free dial service), a three-terminal telecommunication service, a catch phone service, abbreviated dialing service, a receiving call transfer service or the like have been already realized.

By the way, the above-described services such as a calling free telecommunication (free dial service), a three-terminal telecommunication service, a catch phone service, abbreviated dialing service, a receiving call transfer service or the like are served not for the subscribers themselves but for the terminals owned by the subscribers. For this reason, in the case where the credit calling service is realized in the intelligent network, there is a possibility that the subscriber could not enjoy the credit calling service and the other services at the same time.

For example, in the case where the subscriber who has subscriptions both the credit service and the three-terminal telecommunication service uses the credit calling service from the terminal which is not registered in the three-terminal telecommunication service, when the subscriber hangs up for using the three-terminal telecommunication service, the hang-up operation is regarded as the interruption of the calling by the switcher to finish the call.

Also, for example, the operation conducted by the subscriber who requests the credit calling service is to dial a code number for identifying the credit calling service and an ID number allotted to the subscriber under the condition that the terminal is kept in an off-hook state. In response to this, the switcher sends a reception number (or reception message), which indicates the confirmation of the reception of the request of the credit calling service, to the terminal which is being used by the subscriber.

When the terminal used by the subscriber receives the reception number (or reception announce) from the switcher, the subscriber dials a telephone number, a secret number or the like of the called person.

However, since these operations have to be carried out whenever the service is requested, the operations would be complicated.

Accordingly, an object of the present invention is to provide a system in which the subscriber may use the credit calling service and the other service at the same time and to simplify the operation to be conducted by the subscriber who would like to enjoy the credit calling service.

SUMMARY OF THE INVENTION

In order to solve the above-described and other objects, the following construction is used according to the present invention.

A credit call service system according to the present invention is provided with a service switcher station, a service controller means and a service class information replacement means.

The service switcher station is connected to a plurality of terminals. The service switcher station registers telecommunication service information for identifying a telecommunication service which each terminal subscribes. Then, when the service switcher station receives the telecommunication service request from a certain terminal, the service switcher station judges whether or not the telecommunication service information of the telecommunication service which is requested by the terminal is included in the telecommunication service information of the telecommunication service that the terminal subscribes.

In the case where the telecommunication service information of the telecommunication service which is requested by the terminal is included in the telecommunication service information of the telecommunication service that the terminal subscribes, the service switcher station executes the telecommunication service requested by the terminal.

Also, in the case where the telecommunication service information of the telecommunication service which is requested by the terminal is not included in the telecommunication service information of the telecommunication service that the terminal subscribes, the service switcher station does not execute the telecommunication service requested by the terminal.

In the case where the subscriber subscribing the credit call service subscribes telecommunication service beside the credit call service, the service control means enrolls the telecommunication service information of the telecommunication service the subscriber subscribes.

When the request for the credit call service is generated from the subscriber, the service control means output the telecommunication service information registered for the subscriber and notifies the service switcher station of the read-out telecommunication service information.

The service class information replacement means replaces the telecommunication service information of the telecommunication service the terminal used by the subscriber subscribes, by the telecommunication service information of the telecommunication service the subscriber subscribes. Namely, when the telecommunication service information from the service control means is given to the service switcher station, the service class information replacement means replaces, by the telecommunication service information of the telecommunication service the subscriber subscribes, the telecommunication service information registered in the service switcher station for the telecommunication service that the terminal used by the subscriber subscribes.

In this case, the service switcher station may provide the telecommunication service that the subscriber subscribes rather than the telecommunication service that the terminal used by the subscriber subscribes for the subscriber who utilizes the credit call service.

Also, the service switcher station may be provided with a designated number generation identifying means for dealing with the call from the subscriber as the credit call within the number designated by the subscriber.

In this case, if the subscriber notifies the service switcher of the designated number in advance, the subscriber may enjoy the credit call service without any operation for receiving the credit call service for the call within the designated number.

Furthermore, the service switcher station may be provided with a designated time generation identifying means for dealing with the call from the subscriber as the credit call within the designated time period from the set time designated by the subscriber.

In this case, if the subscriber notifies the service switcher of the set time and the designated time period in advance, the subscriber may enjoy the credit call service without any operation for receiving the credit call service for the call within the designated period of time from the set time.

DESCRIPTION OF THE PREFERRED EMBODIMENTS

The present invention will now be described by way of example.

Figure 1:
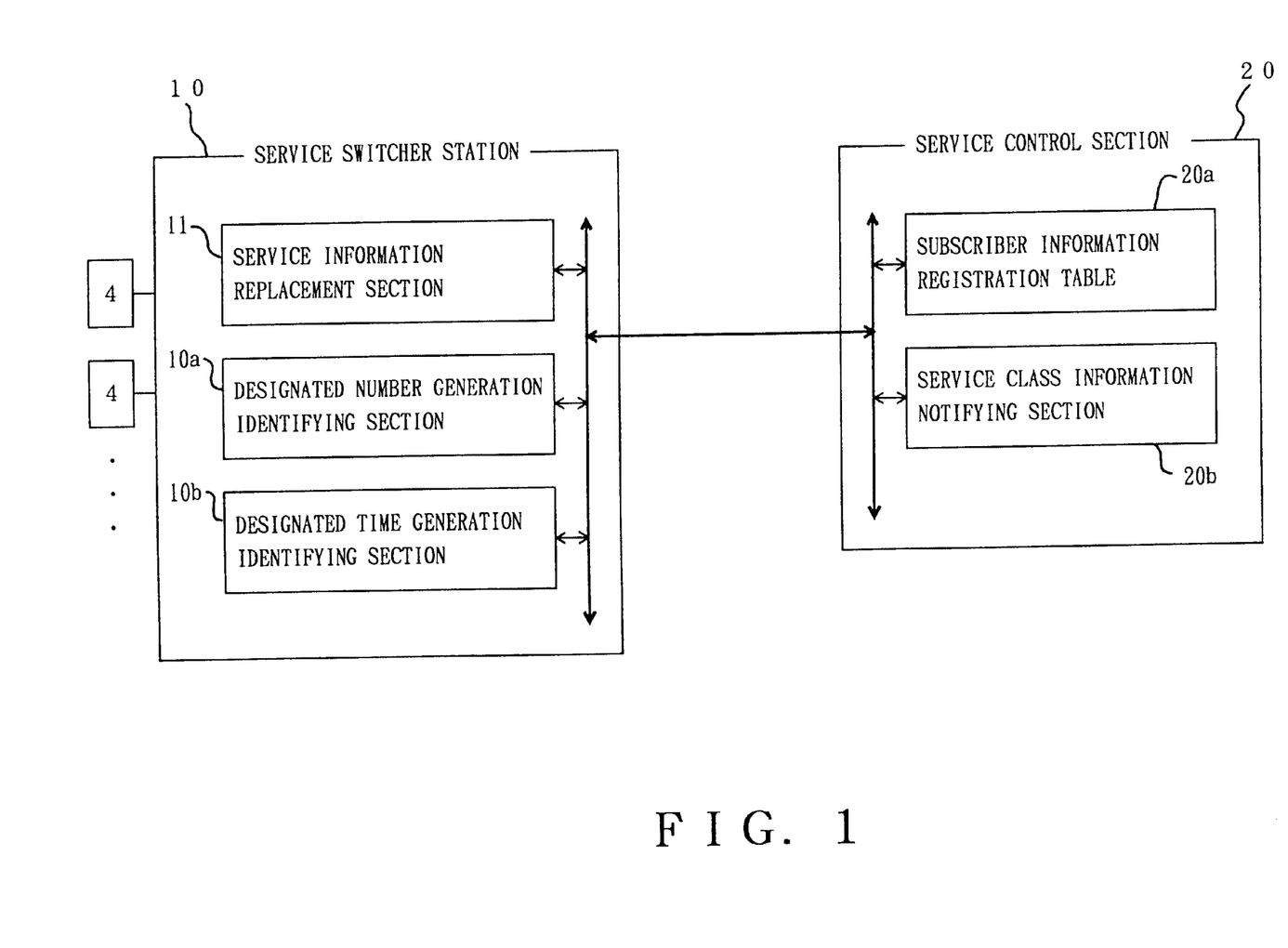
FIG. 1 is a view showing a basic structure of a credit call service system according to the present invention.

The outline of the present invention will first be described with reference to FIG. 1. A credit calling service system is provided with a service switcher 10 and a service control section 20.

The service control section 20 is provided with a subscriber information registration table 20a and a service information notifying section 20b.

The subscriber information registration table 20a enrolls communication service information for specifying a communication service which each subscriber subscribes for each subscriber identifying information for an individual subscriber.

The service information notifying section 20b receives a credit calling service request from the subscriber and subscriber identifying information through the service switch station 10. The service information notifying section 20b searches the subscriber information registration table 20a by using the received subscriber identifying information as a key word and reads out the telecommunication service information of the telecommunication service.

The telecommunication service information read by the service information notifying section 20b is fed to the service switcher station 10.

The service switcher station 10 enrolls the telecommunication service information of the telecommunication service which each terminal 4 subscribes for each terminal identifying information for identifying an individual terminal 4 although not shown.

Furthermore, the service switcher station 10 is provided with a service class replacement section 11, a designated number generation identifying section 10a and a designated time generation identifying section 10b.

The above-described service class replacement section 11 serves to replace the telecommunication service information (i.e., telecommunication service information of the telecommunication service of which the subscriber himself or herself makes a subscription) from the service information notifying section 20b and the telecommunication service information of the telecommunication service which the terminal 4 being used by the subscriber subscribes.

For example, the service information replacement section 11 the received subscriber identifying information and the credit calling service request to the service information notifying section 20b of the service control section 20 when it received the credit calling service request from the subscriber A who is using the terminal 4.

At this time, the service information notifying section 20b conducts the search over the subscriber information registration table 20a by using the subscriber identifying information from the service information replacement section 11 as a key word, and reads out the telecommunication service information of the telecommunication service of which the subscriber makes the subscription. Then, the service information notifying section 20b sends the telecommunication service information read out from the subscriber information registration table 20a to the service class replacement section 20b of the service switcher station 10.

When the service class replacement section 20b receives the telecommunication service information (i.e., the telecommunication service information of the telecommunication service the subscriber himself or herself subscribes) from the service information notifying section 20b, the service class replacement section 20b replaces the service information of the telecommunication service which the terminal used by the subscriber A subscribes and the received telecommunication service information with each other.

In this case, for the subscriber A, the service switcher station 10 provides the telecommunication service which is no subscribed by the terminal 4 which is used by the subscriber A but which is subscribed by the subscriber himself or herself.

The designated number generation identifying section 10a enrolls the designated number each subscriber designates. Then, the designated number generation identifying section 10a deals with a call from the subscriber as credit calls within the designated number of calls.

In this case, within the designated number of calls, the subscriber A may receive the credit calling service only by carrying the regular operation which is the same as in the regular call.

The designated time generation identifying section 10b enrolls the designated time period and the set time designated by each subscriber. Then, the designated time generation identifying section 10b deals with calls from the subscriber within the designated time period from the set time as credits.

For example, in the case where the designated time period "10 minutes" and the set time "22:00" are registered for the subscriber A, the calls from the subscriber A are dealt with as the credit calls during the period of 10 minutes from 22:00.

In this case, if the calling time is between 22:00 to 22:10, the subscriber may enjoy the credit calling service simply by carrying out the same operation as the regular calling.

The credit calling service system according to the present invention will now be described.

Embodiment 1

Figure 2:
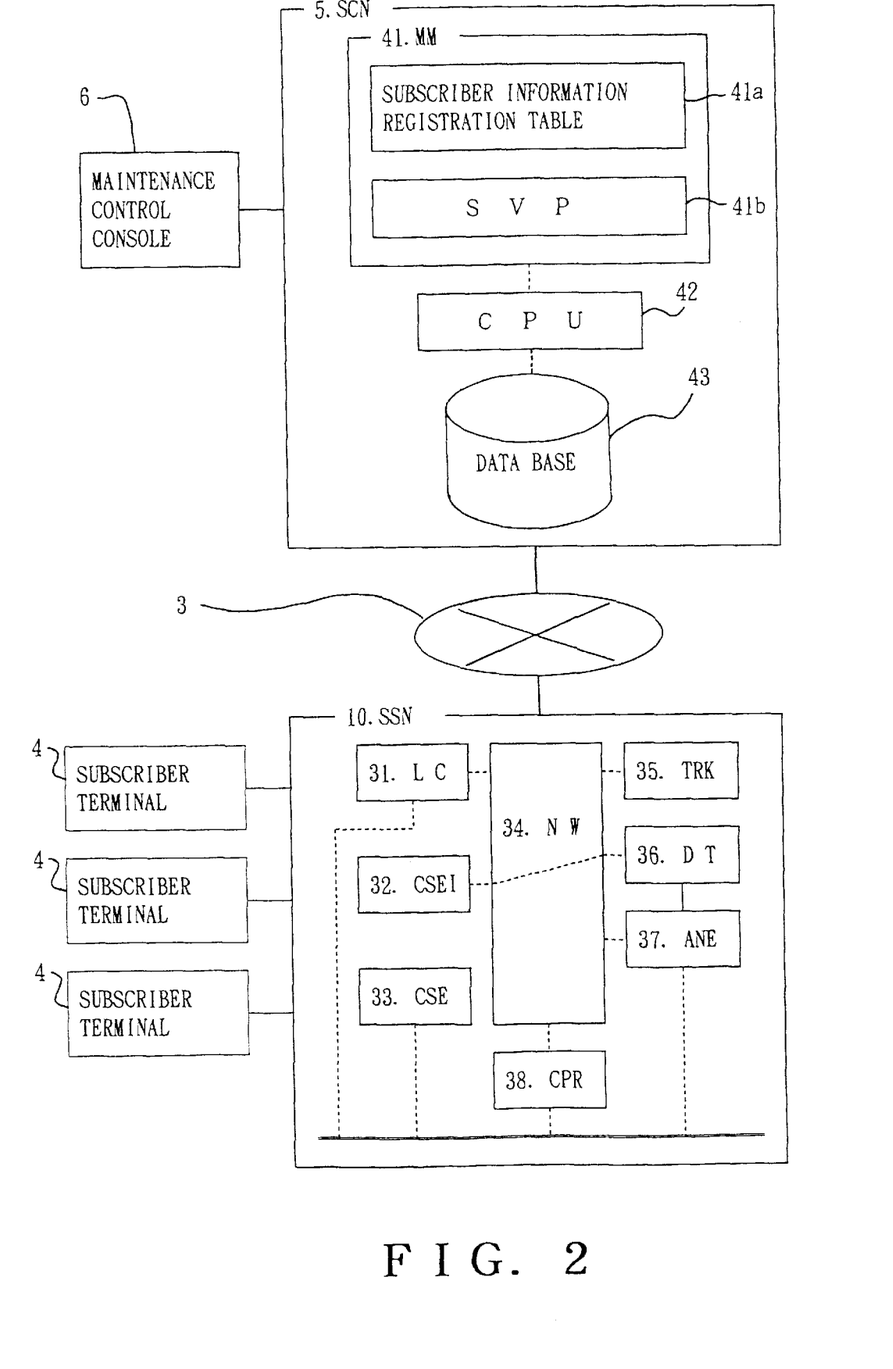
FIG. 2 is a schematic structural view showing an intelligent network to which the credit call service system according to the present invention is applied.

FIG. 2 is a schematic structural view showing an intelligent Network to which the credit calling service system is applied. As shown in FIG. 2, the intelligent network is composed of the service switcher station 10 to which a plurality of terminals 4 are connected, a service control node (SCN) 5 and a maintenance control console 6 connected to this service control node (SCN) 5.

The above-described service switcher station (SSN) 10 and the service control node (SCN) 5 are connected to each other through No. 7 signal network 3 determined by an advice of 700th in accordance with CCITT.

Each terminal 4 is one to which each decisive reception number is allotted and may subscribe a three-terminal calling service, an abbreviated dialing service, a camp-on service, a catch phone service, a transfer service, a fee discount service or the like. The terminal 4 may be a personal computer or the like with, for example, a telephone, a facsimile, a modem function or the like.

The service switcher station (SSN) 10 is provided a line circuit (LC) 31, a common signal interface (CSEI) 32, a common line signal element (CSE) 33, a network switching module (NW) 34, a trunk (TRK) 35, a digital terminal (DT) 36, an announce element(ANE) 37, and a call processor (CPR) 18.

The line circuit (LC) 31 is connected to the terminals 4 for supervising the calling, response, hooking and the like of the terminals 4. Also, the line circuit (LC) 31 transfers the signal from the terminal 4 to the network switching module (NW) 34, and at the same time, sends the signal from the net work switching module (NW) 34 to the terminal 4.

The common signal element (CSE) 33 sends the control signal to the above-described service control node (SCN) 5 through the line circuit (LC) 31 from the above-described network switching module (NW) 34, and at the same time, receives the control signal, from the above-described service control node (SCN) 5, from the line circuit (LC) 31 through the net work switching module (NW) 34.

The common signal interface element (CSEI) 32 carries out the interface process for the common signal element (CSE) 33 and the digital terminal (DT) 36. More specifically, in the case where the common signal element (CSE) 33 receives an acoustic signal which has been PCM coded from the service control node (SCN) 5, the signal is converted into a signal mode which may be processed by the digital terminal (DT) 36 and is outputted to the digital terminal (DT) 36.

When the digital terminal (DT) 36 receives the signal which is one obtained by PCM coding the acoustic signal from the common signal interface element (CSEI) 32, the received signal is decoded and outputted to the announce element (ANE) 37.

The announce element (ANE) 37 generates the acoustic message to be fed to the terminal 4, and holds each acoustic message for every announce code for specifying each acoustic message. The acoustic message held therein is an acoustic message from which a portion different according to each subscribe is removed. When the acoustic message from which the portion has been removed is outputted from the digital terminal (DT) 36, this acoustic message and the held acoustic message are combined with each other to complete a final acoustic message. The completed acoustic message is inputted to the line circuit (LC) 31 through the network switching module (NW) 34 and is further fed to the terminal 4 from the line circuit (LC) 31.

The trunk (TRK) 35 carries out the reception and sending of the signals relative to other telecommunication network.

Figure 3:
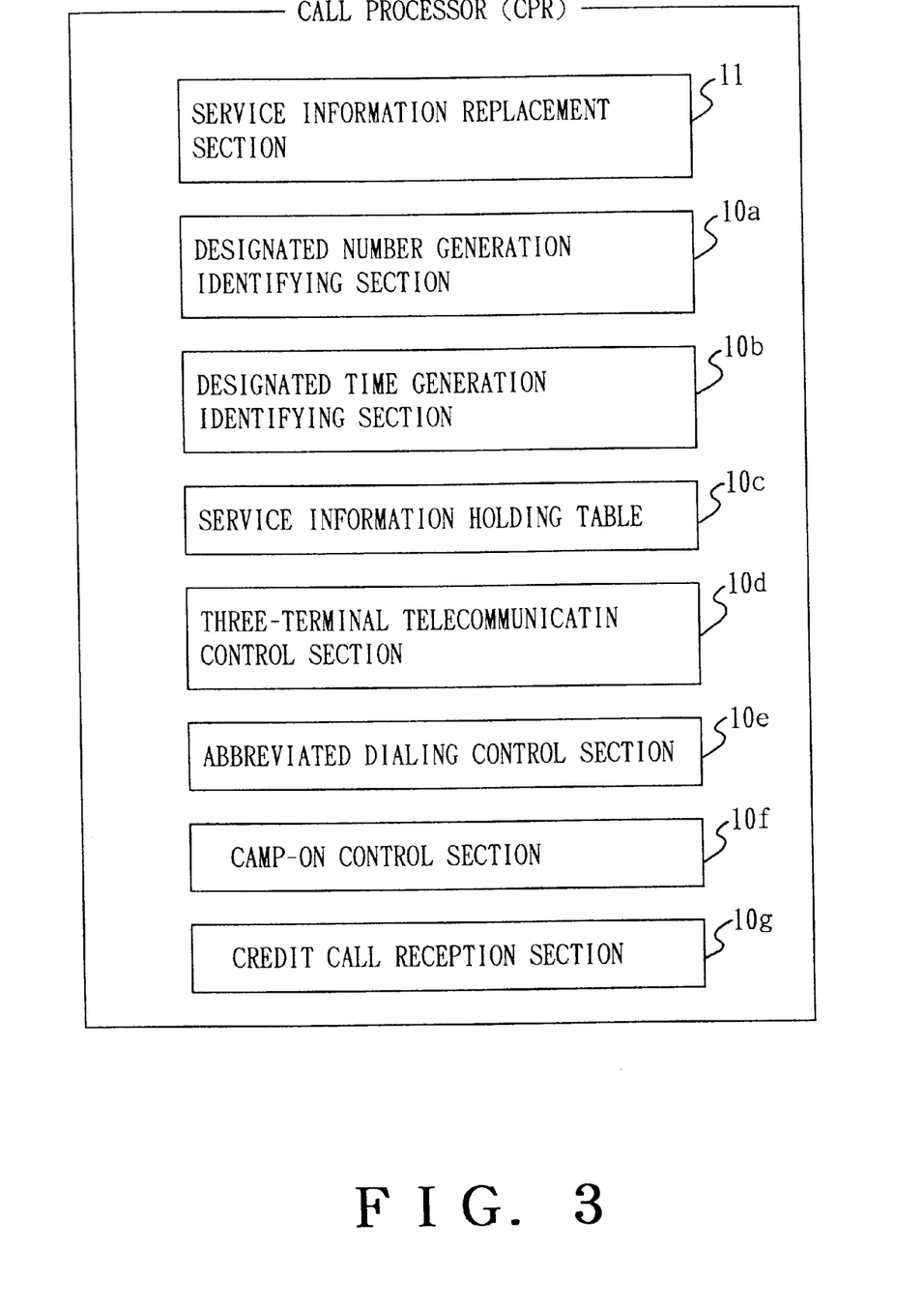
FIG. 3 is a block diagram showing a function basis structure of a call processor.

The call processor (CPR) 38 controls an operation of each of the above-described sections in accordance with the service request from the terminal 4 or the instruction from the service control node (SCN) 5. The function realized by the call processor (CPR) 38 will now be described with reference to FIG. 3. As shown in FIG. 3, the call processor (CPR) 38 realizes the functions of the service information replacement section 11, the designated number generation identifying section 10a, the designated time generation identifying section 10b, service information holding table 10c, three-terminal telecommunication control section 10d, abbreviated dialing control section 10e, camp-on control section 10f, and credit call reception section 10g.

When the credit call reception section 10g receives the code number indicating the credit service request and the ID number of the subscriber at the calling resource from the terminal 4, the credit call reception section 10g sends the call control instruction requesting signal which is obtained by adding these code number and the ID numbers, to the service control node (SCN) 5.

The service information holding table 10c enrolls the telecommunication service information for identifying the telecommunication service into which each terminal 4 is subscribed for every receiving call number of each terminal 4.

When the call control instruction signal including the telecommunication service information registered for the subscriber who requests the credit call service is fed from the service control node (SCN) 5 to the service information replacement section 11, the latter replaces the telecommunication service information registered in the above-described service information holding table 10c by the telecommunication service information fed from the above-described service control node (SCN) 5. Thereafter, the credit call reception section 10g charges the call charge to the subscriber on the calling side.

The designated number generation identifying section 10a holds the designated number for every ID number for specifying the individual subscriber. This designated number is the number that is set up to a desired one by each subscriber. A method for dialing the code number representative of the set request for the designated number after the subscriber has hook off or hung up and the ID number for the subscriber is exemplified as one setting method. In case of this method, when the designated number generation identifying section 10a the code number representative of the set request of the designated number and the ID number of the subscriber from the subscriber, the designated number generation identifying section 10a feeds the signal sending request of the above-described ID number and the telecommunication service from the credit call receiving section 10g to the service control node (SCN) 5. When the telecommunication service information of the telecommunication service which the subscriber subscribes is received from the service control node (SCN) 5, the telecommunication service information registered in the above-described service information holding table 10c for the terminal 4 which the above-described subscriber is using is replaced by the telecommunication service information which has been sent. Furthermore, the designated number generation identifying section 10a holds the receiving number of the terminal 4 which is used by the subscriber and the ID number and the designated number which have been sent from the subscriber.

Also, when the designated number generation identifying section 10a identifies the call from a certain terminal 4, the designated number generation identifying section 10a judges the receiving number of the above-described terminal 4 by the line circuit (LC) 31. The judged receiving number is compared with the receiving number held in the designated generation identifying section 10a. Now, when the receiving number of the above-described terminal 4 is held in the above-described designated number generation identifying section 10a, the designated number generation identifying section 10a reads out the ID number held together with the above-described receiving number, and outputs a signal to the credit call reception section 10g. The credit call reception section 10g sends the ID number outputted from the designated number generation identifying section 10a and the code number representative of the credit call service request to the service control node (SCN) 5. The code number representative of the credit call service request is fed to the service control node (SCN) 5, the designated number generation identifying section 10a decrements, by one, the designated number held together with the above-described receiving number. Here, in the case where the decremented designated number becomes zero, the designated number generation identifying section 10a cancels the above-described receiving number and the ID number.

If the subscriber utilizes this designated number generation identifying section 10a, the subscriber may receive the credit call service without any operation for the credit call service request within the designated number.

Subsequently, the designated time generation identifying section 10b holds the set time and the designated time period for every ID number for identifying the individual subscriber. The designated time period means a period of time set desirably by each subscriber, and the set time means a time set for a designated time by each subscriber. A method for dialing the code number representative of the set request of the designated time, the number representative of the designated time period and the ID number of the subscriber after the subscriber has hang up or hooked off may be exemplified as one method. In the case where this method is used, when the designated time generation identifying section 10b receives the code number representative of the set request for the designated time period, the number representative of the designated time and the ID number of the subscriber from the subscriber, the signal sending request of the telecommunication service and the above- described ID number are sent from the credit call reception section 10g to the service control node (SCN) 5. Then, when the telecommunication service information of the telecommunication service subscribed by the subscriber is fed from the service control node (SCN) 5, the telecommunication service information registered in the above-described service information holding table 10c for the terminal 4 which is used by the above- described subscriber is replaced by the above-described received telecommunication service information. Furthermore, the designated time generation identifying section 10b holds the receiving number of the terminal 4 used by the above- described subscriber, the ID number and the designated time period fed from the above-described subscriber, and simultaneously therewith, holds the time (set time) set for this designated time.

Also, when the designated time generation identifying section 10b identifies the call from a certain terminal 4, it Judges the receiving number of the above-described terminal 4 by the line circuit (LC) 31. The Judged receiving number is compared with the receiving number held in the designated time generation identifying section 10b. Now, if the receiving number of the above-described terminal 4 is held in the abovedescribed designated time generation identifying section 10b, the designated time generation identifying section 10b reads out the ID number held together with the above-described receiving number and outputs a signal to the credit call reception section 10g. The credit call reception section 10g sends the ID number outputted from the designated time generation identifying section 10b and the code number representative of the credit call service request to the service control node (SCN) 5. Incidentally, when the time which is obtained by adding the designated time period to the set time being held is identified with the current time (i.e., when the designated period has elapsed from the set time), the designated time generation identifying section 10c cancels the above-described receiving number, the ID number, the set time and the designated time period.

If the subscriber utilizes this designated time generation identifying section 10b, the subscriber may receive the credit call service without any operation for the credit call service request within the time period e from the set time.

When the three-terminal telecommunication control section 10d receives the code number representative of the three- terminal telecommunication service request from the terminal 4, it searches the service information holding table 10c by using the telephone number of its terminal 4, and judges whether the above-described terminal 4 subscribes the three- terminal telecommunication service or not. If the abovedescribed terminal 4 subscribes the three-terminal telecommunication service, the three-terminal telecommunication service is executed. On the other hand, if the above-described terminal 4 does not subscribe the three-terminal telecommunication service, an acoustic message representative of the impossibility of the three-terminal telecommunication service is outputted from the announce element (ANE) and sent to the terminal 4.

When the abbreviated dialing control section 10e receives the code number representative of the abbreviated dialing service request from the terminal 4, it searches the service information holding table 10c by using the telephone number of the terminal 4, and judges whether or not the above-described terminal 4 subscribes the abbreviated dialing service. Then, if the above-described terminal 4 subscribes the abbreviated dialing service, the abbreviated dialing service is executed. On the other hand, if the above-described terminal 4 does not subscribe the abbreviated dialing service, an acoustic message representative of the impossibility of the abbreviated dialing service is outputted from the announce element (ANE) 37 and sent to the terminal 4.

When the camp-on control section 10f receives the code number representative of the camp-on service from the terminal 4, it searches the service information holding table 10c by using the telephone number of its terminal 4 as a key word, and judges whether or not the above-described terminal 4 subscribes the camp-on service. Then, if the above-described terminal 4 subscribes the camp-on service, the camp-on service is executed. On the other hand, if the above-described terminal 4 does not subscribe the camp-on service, an acoustic message representative of the impossibility of the camp-on service is outputted from the announce element (ANE) 37 and sent to the terminal 4.

Turning back to FIG. 2, the service control node (SCN) 5 is composed of a main memory (MM) 41, a CPU 42 and a data base 43.

The main memory (MM) 41 stores therein a program (SVP) 41*b* which is executed by the CPU 22 and a subscriber information table 41*a*.

Figure 4:
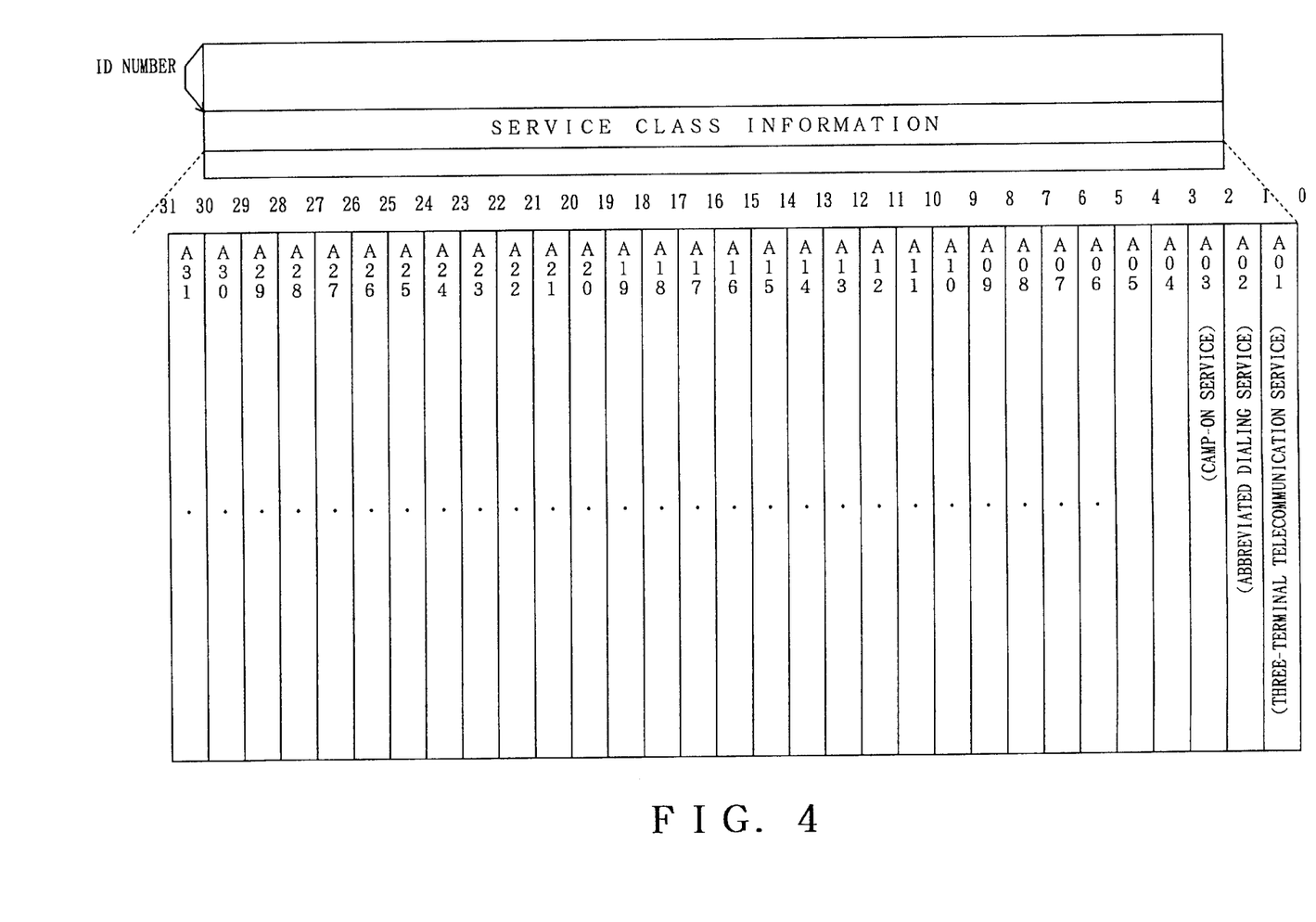
FIG. 4 is a view showing a structure of a subscriber information table.

In the subscriber information table 41*a*, an entry for registering the information for identifying the telecommunication service subscribed by each subscriber is set. The entry is divided in regions for every telecommunication service. A flag (0: non-subscription, 1: subscription) is stored in each region for identifying whether or not the subscriber subscribes each telecommunication service. For example, each entry of the subscriber information table 41*a* is divided into 31 regions A01 to A31 as shown in FIG. 4. The region A01 stores therein a flag for identifying whether or not the subscriber subscribes the three-terminal telecommunication service. The region A02 stores therein a flag for identifying whether or not the subscriber subscribes the abbreviated dialing service. The region A03 stores therein a flag for identifying whether or not the subscriber subscribes the camp- on service. Also, the following regions store flags for identifying whether or not the subscriber subscribes the other telecommunication services.

Turning to FIG. 2, the data base 43 stores therein the telephone number to be called as a transfer destination in the receiving call transfer service or the like.

The CPU 42 executes the program (SVP) 41*b* of the main memory (MM) 41. Here, the CPU 42 executes the program (SVP) 41*b* of the main memory (MM) 41 so that the function of the service information notifying section is realized according to the present invention. More specifically, if the CPU 42 receives the request signal for the credit call service from the service switcher station (SSN) 10, the ID number is picked up out of this credit call service request signal and the subscriber information registration table 41*a* is searched over by using the picked-up ID number as a key word. Then, the CPU 42 reads out the telecommunication service information registered in the entry of the ID number. Thus, the read-out telecommunication service information is fed to the service switcher node (SSN) 10.

Figure 5:
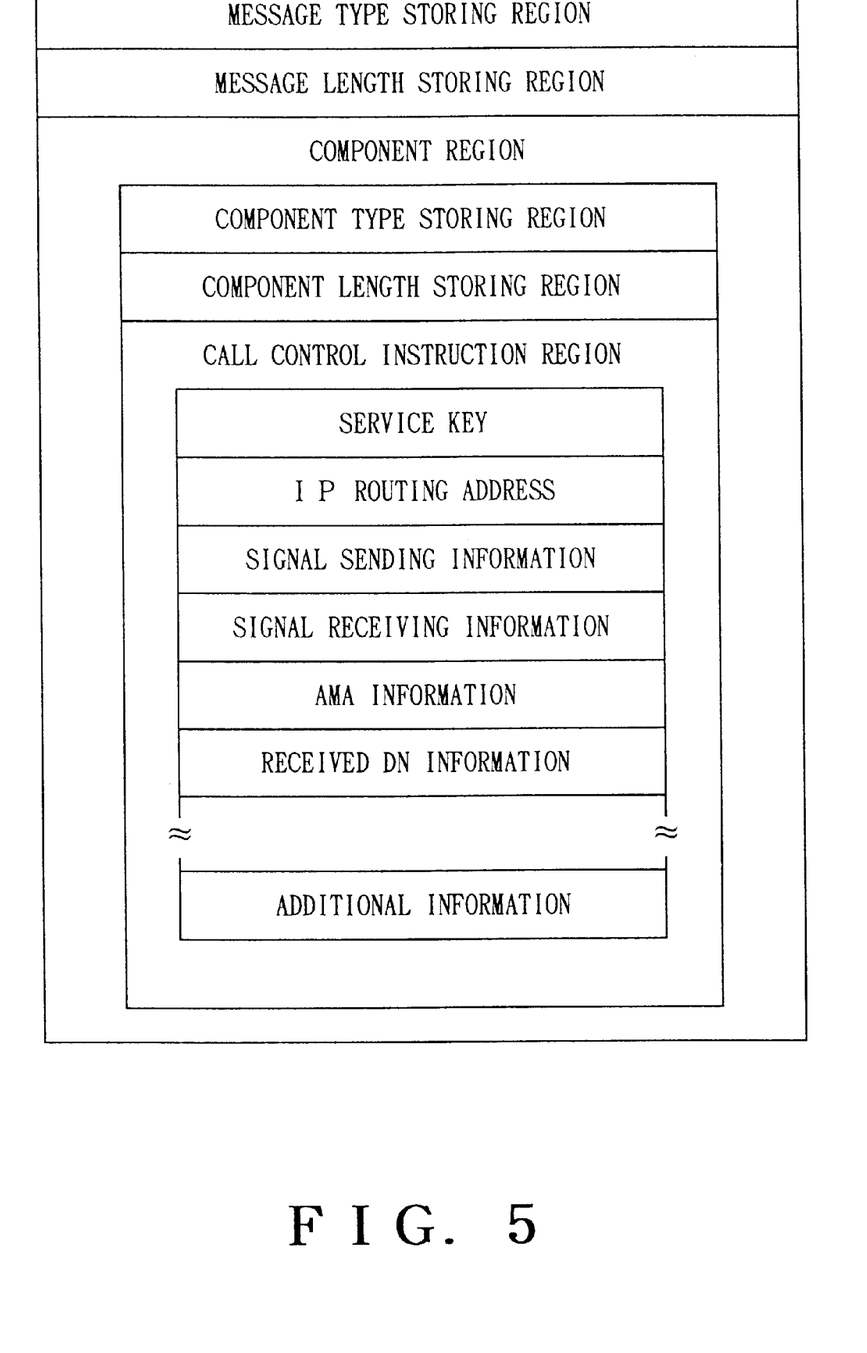
FIG. 5 is a view showing a format of a call control instruction signal.

A method for writing a signal into the call control instruction signal to be fed from the service control node to the service switcher station in the No. 7 signal network 3 may be exemplified as a signal sending method of the telecommunication service information. As shown in FIG. 5, this call control instruction signal is composed of a message type storing region, a message length storing region and a component region.

The message type storing region is used as a region for registration of a kind of the call control instruction signal.

The message length storing region is used as a region for registration of a length of the overall call control instruction signal.

The component portion is used as a region for storing an operation for the service switcher station (SSN) 10 and is composed of a component type storing region, a component length storing region and a call control instruction region.

The component type storing region is used as a region for storing information representative of a kind of the operation stored in the component portion.

The component length storing region is used as a region for registration of the length of the component portion.

The call control instruction region is used as a region which may be freely defined for each signal network, and is composed of a service key for identifying the individual telecommunication service, an IP routing address representative of an announce code of the acoustic announce to be sent to the terminal 4, sending information representative of a receiving signal completion signal such as a called side telephone number, calling side telephone number and the like, receiving information representative of numerical information, call charging information or the like to be added to the acoustic announce, AMA information representative of supervision information, received DN information representative of the telephone number of the called side terminal and the like. Then, it is sufficient to add the telecommunication service information to this call control instruction region.

Turning back to FIG. 2, the maintenance control console 6 is used to write data to the subscriber information registration table 41*a* or renews the data of the data base 43.

The effect and advantage of the foregoing embodiment will now be described.

Figure 6:
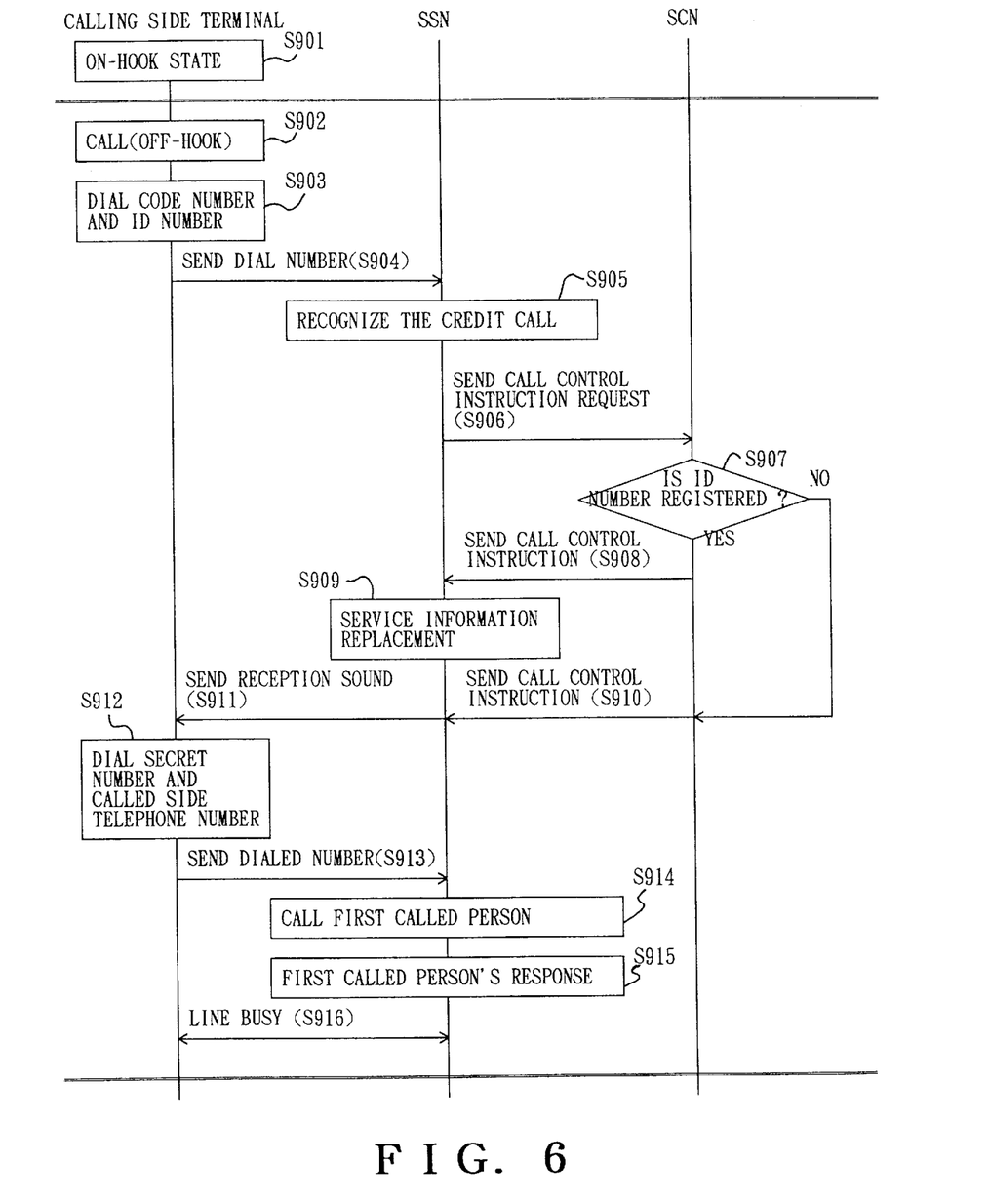
FIG. 6 is a sequence view (1) representing a credit call service providing operation.
Figure 7:
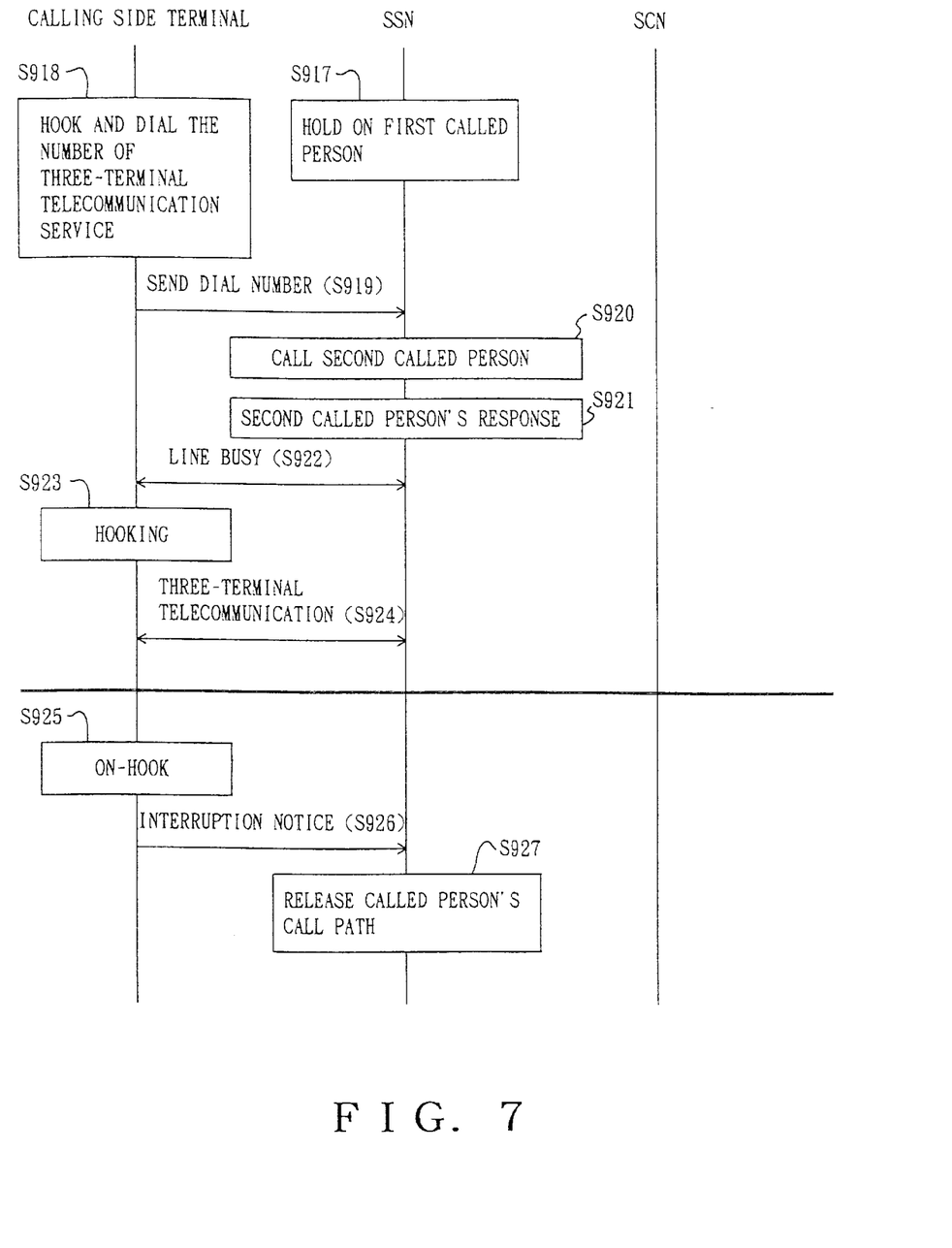
FIG. 7 is a sequence view (2) representing a credit call service providing operation.

The credit calling service providing operation will be described with reference to FIGS. 6 and 7.

First of all, when the terminal 4 is changed from the on-hook condition (interruption condition) (step S901) to the off- hook condition, the line circuit (LC) of the service switcher station (SSN) 10 detects the condition that the terminal 4 is hooked on (step S902).

Here, when the subscriber dials the code number representative of the credit call service request and the ID number of the subscriber (step S903), the dialed numbers are fed from the calling side terminal 40 to the service switcher station (SSN) 10 (step S904).

In the service switcher station (SSN) 10, the code number fed from the subscriber is notified from the line circuit (LC) 31 to the call processor (CPR) 38. The call processor (CPR) 38 to which the code signal is sent judges that the above-described code number is the code number representative of the request for the credit call service (step S905).

In order to receive the control instruction concerning the credit call, the call processor (CPR) 38 of the service switcher station (SSN) 10 writes the ID number of the above- described subscriber to the call control instruction requesting signal and sends it to the service control node (SCN) 5 (step S906).

When the CPU 42 of the service control node (SCN) receives the call control instruction requesting signal from the service switcher station (SSN) 10, it searches the subscriber information table 41*a* of the main memory (MM) 41 by using the ID number as a key word and judges whether or not the ID number is registered (step S907).

In step S907, if the above-described ID number is registered in the subscriber information table 41*a*, the CPU 42 reads out the telecommunication service information of the subscriber identified by the ID number from the subscriber information table 41*a*, writes this communication service information to the call control instruction signal and sends it to the service switcher station (SSN) 10 (step S908).

In step S907, if the above-described ID number is not registered in the subscriber information table 41*a*, the CPU 42 judges that the subscriber does not subscribe the credit call service, writes the judgement result to the call control instruction signal and sends it to the service switcher station (SSN) 10 (step S910).

In the service switcher station (SSN) 10, the common signal element (CSE) 33 receives the call control instruction signal from the service control node (SCN) 5, and judges whether or not the communication service information of the subscriber is written in the call control instruction signal. Here, if the communication service information is written in the call instruction signal, the common signal element (CSE) 33 notifies the call processor (CPR) 38 of the above-described telecommunication service information. The call processor (CPR) 38 registers the noticed telecommunication service information as the telecommunication service information of the terminal 4 used by the above-described subscriber to the telecommunication service information holding table 10c (step S909). Accordingly, for example, if the subscriber contracts a catch phone service but the catch phone service is not contracted on the calling side terminal 40, the calling side terminal 40 may receive the catch phone service during the service of the credit call. Then, the service switcher station (SSN) 10 sends to the calling side terminal 40 a reception sound representative of the reception of the call (step S911).

On the other hand, in the case where the information that the subscriber does not subscribe the credit call service is not written in the control instruction signal received in the common signal element (CSE) 33 of the service switcher station (SSN) 10, the common signal element (CSE) 33 informs the processor (CPR) 38 of the result. The call processor (CPR) 38 deals with the call from the subscriber not as the credit call but as the regular call and sends the reception sound representative of the call from the line circuit (LC) 31 to the calling side terminal 40 (step S911).

When the terminal 4 receives the reception sound, the secret number and the calling side telephone number are dialed (step S912).

The number dialed in the step S912 is sent from the terminal 4 to the service switcher station (SSN) 10 (step S913).

When the service switcher station (SSN) 10 receives the calling side telephone number from the calling side terminal 4, it calls the called side terminal (called person) specified by the called side telephone number (step S914).

When the called side terminal responds thereto (step S915), a call path connected to the terminal 4 which is used by the calling side subscriber is connected to a call path connected to the called side terminal by the network switching module (NW) 34 to thereby establish the call between the calling side terminal and the called side terminal (step S916).

After that, in the case where the subscriber on the calling side uses the three-terminal telecommunication service, the calling side terminal is held on by the calling side subscriber (step S917). After the hooking operation is carried out in the calling side terminal 4, when the code number representative of the three-terminal telecommunication service and the called telephone number of the called side terminal which is different from the above-described called side terminal (step S918) are dialed, the hooking signal, the code number and the called side telephone number are sent to the service switcher station (SSN) 10 (step S919).

When the service switcher station (SSN) 10 receives the hooking signal, the code number and the called telephone number from the calling side terminal 4, first of all, the station judges that the code number represents the request for the three-terminal telecommunication. Then, the service switcher station (SSN) 10 calls the terminal specified by the received called telephone number (step S920).

When the second called person responds (step S921), the call between the calling side subscriber and the called side terminal is established (step S922).

Here, when the calling side subscriber effects the hooking operation (step S923), the three-terminal telecommunication service is established among the calling side terminal 4 and the above-described two called side terminals (step S924).

Subsequently, when the on-hook operation is carried out in the calling side terminal 4( step S925), the on-hook signal (interruption notice) is fed from the calling side terminal 4 to the service switcher station (SSN) 10 (step S926). Then, when the service switcher station (SSN) 10 receives the above- described on-hook signal, the call pass connecting the above- described three terminals is interrupted by the network switching module (NW) 34 (step S927).

As described above, according to the foregoing embodiment, it is possible for the subscriber utilizing the credit call service to receive the telecommunication service subscribed by the subscriber himself or herself regardless of the subscription/non-subscription of the terminal used by the subscriber.

Also, the subscriber may set the designated number or the designated time in advance. Thus, within the designated number or the designated time period, the subscriber may receive the credit call service only by the operation for the regular call.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A credit call service system comprising:

a service switcher station to which a plurality of terminals are connected, for registering telecommunication service information for identifying a telecommunication service which each terminal subscribes, and executing the requested telecommunication service when receives a request for the telecommunication service from said terminal if the telecommunication information of the requested telecommunication service is registered for said terminal;

a service control means for registering the telecommunication service information for identifying the telecommunication service subscribed by a subscriber who subscribes a credit call service for charging a call charge to the subscriber on a calling side, and notifying said service switcher station of the telecommunication service information registered for said subscriber when receives the credit call service request from said subscriber; and a service information replacement means for replacing the telecommunication service information registered in said service switcher station for the terminal which is used by said subscriber by telecommunication service information notified from said service control means.

2. The credit call service system according to claim 1, wherein said service control means comprises:

a subscriber information registration table for registering communication service identifying information for identifying the communication service which each subscriber subscribes for every subscriber identifying information for defining an individual subscriber; and a service information notifying section for receiving the subscriber identifying information and the request for credit call service from said subscriber, searching said subscribed information registration table by using the received subscriber identifying information, thereby reading out the telecommunication service information of the telecommunication service that the subscriber subscribes, and notifying said service switcher station of the read-out telecommunication service information.

3. The credit call service system according to claim 1, wherein said service switcher station comprises a designated number generation identifying means for registering a number designated by the subscriber and dealing with a call from the subscriber as a credit call within the designated number.

4. The credit call service system according to claim 1, wherein said service switcher station comprises a designated time generation identifying means for registering a designated time period and a set time which are set by the subscriber and dealing with a call from the subscriber as a credit call within the designated time period from said set time.

\* \* \* \* \*